Patented Feb. 19, 1935

1,991,860

UNITED STATES PATENT OFFICE 1,991,860

MANUFACTURE OF RUBBER AND SIMILAR MATERIAL

Evelyn William Madge, Stockland Green, Birmingham, England, assignor to Dunlop Rubber Company Limited, London, England, a corporation of Great Britain No Drawing. Application March 15, 1932, Serial No. 599,070. In Great Britain May 4, 1931

10 Claims. (Cl. 18—53)

This invention comprises improvements in or relating to the manufacture of goods of rubber or similar material by any one or more operations such as molding, spreading, impregnating, spraying or dipping from aqueous emulsions or dispersions thereof the kinds hereinafter specified, having admixed therein variable quantities of one or more aromatic di-substituted guanidines.

The object of the invention is to produce by any one or more of the aforesaid operations, porous or microporous articles of vulcanized rubber or the like in particular battery separators or filtering cones.

It has already been proposed to manufacture non-porous rubber articles direct from a rubber latex by subjecting the latex containing as a promoter of thickening and coagulation an aromatic di-substituted guanidine, for example, symmetrical diphenylguanidine, symmetrical phenyl-o-tolylguanidine, or symmetrical di-o-tolylguanidine, to local heating to the forming temperature at the surface or surfaces whereat the rubber is to be formed so as there to produce local thickening of the latex and the formation therefrom of the layer of compact coagulated rubber.

It has been found that according to the present invention latex mixings treated in the manner specified are particularly suitable for the preparation of porous or microporous articles of rubber. The aromatic di-substituted guanidines are easily introduced into the aqueous dispersions aforesaid and aqueous dispersions treated in this manner also yield well formed gel-like products.

According to the invention, the process for the manufacture of porous or microporous articles of vulcanized rubber or the like, comprises admixing in aqueous emulsions or dispersions of the kinds hereinafter specified, variable quantities of one or more of the aromatic di-substituted guanidines coagulating or gelling the thus treated emulsions or dispersions by the application of heat in any one or more operations such as molding, spreading, impregnating, spraying or dipping, and thereafter vulcanizing in known manner the products so obtained, under such conditions that evaporation of the liquid contained in the pores or micropores is prevented.

The products obtained from the aqueous dispersions aforesaid are to be such as to contain desired amounts of the dispersion medium substantially uniformly distributed in the pores, capillaries or cells of microscopic or ultramicroscopic dimensions of the structure of the solids produced. The deposits so formed are strong, homogeneous, irreversible, solid structures without pores visible to the naked eye.

If the subsequent vulcanization of the deposits obtained is carried out in such manner as to prevent the escape of the dispersion medium included in their structure, porous or microporous articles are obtained.

Among the reagents which can be employed for the purpose of this invention are, for instance, symmetrical diphenylguanidine, symmetrical phenyl-o-tolylguanidine or symmetrical di-o-tolylguanidine.

The emulsions or dispersions comprise those consisting of or containing rubber, gutta-percha, balata or similar vegetable resins occurring naturally or artificially obtained.

Such artificial aqueous dispersions may include those of coagulated rubber, vulcanized rubber, synthetic rubber, waste or reclaim. If desired, any of the aforementioned dispersions may be used alone or in admixture with one another.

Any of the aforesaid dispersions may contain the usual known compounding ingredients and/or may be in concentrated form.

Concentrates such as are obtained in Patent 1,846,164, February 23, 1932 or in British Patent 219,635, to which may be added any one or more of the usual compounding ingredients.

The following example illustrates how the process can be effected for the production of microporous ebonite separators.

A latex mixing of the following composition—

| | Parts by weight |
|---|---|
| Rubber | 100 |
| Sulphur | 50 |
| Zinc oxide | 2 |
| Mineral oil | 10 |
| Lamp black | 2 | is prepared from a 60% rubber latex obtained by centrifugal action. The final alkalinity of the mixing is 0.15% expressed in terms of ammonia, and the solid contents 45% to 50%. This latex mixing is cooled to about 5° C. To 100 grams of this fluid mixing 0.7 grams of diphenylguanidine made into a thin paste with water preferably containing gum acacia approximately 2% on the diphenylguanidine, is added.

The resulting thin fluid is poured into a separator mold. After closing the mold and clamping, the mixing may be directly vulcanized, gelling taking place in the vulcanizing operation, or allowed to gel in hot water and subsequently vulcanized.

The vulcanization is made to take place while the mold is completely immersed in hot water and subjected to a steam pressure, care being taken that the mold is totally immersed during the vulcanization. Good vulcanization can be made to take place in two and a half hours at 75 to 80 pounds pressure of steam, after which the mold is cooled before opening and the separator produced is then rinsed and allowed to dry.

What I claim is—

1. A process for the manufacture of porous or microporous articles of vulcanized rubber or the like from aqueous dispersions of rubber material, which comprises admixing in the aforesaid dispersions an aromatic di-substituted guanidine, heating the thus treated dispersions to gel the dispersion, and vulcanizing the products so obtained under such conditions that evaporation of the liquid contained in the pores or micro-pores is prevented.

2. A process for the manufacture of porous or microporous articles of vulcanized rubber or the like from aqueous dispersions of rubber material, which comprises admixing in the aforesaid dispersions an aromatic di-substituted guanidine, heating the thus treated dispersions to gel the dispersion, vulcanizing the products so obtained under such conditions that evaporation of the liquid contained in the pores or micro-pores is prevented and after vulcanization drying the resulting structure to remove said water from said pores.

3. A process as claimed in claim 1 wherein the aromatic di-substituted guanidine is symmetrical diphenylguanidine.

4. A process as claimed in claim 1 wherein the aromatic di-substituted guanidine is symmetrical phenyl-o-tolylguanidine.

5. A process as claimed in claim 1 wherein the aromatic di-substituted guanidine is symmetrical di-o-tolylguanidine.

6. A process for the manufacture of porous or microporous articles of rubber or the like from aqueous dispersions thereof, which comprises admixing in the aforesaid dispersions an aromatic di-substituted guanidine, forming said dispersion to a predetermined shape and mass, heating the formed dispersion to coagulate and gel the dispersion, and vulcanizing the gelled dispersion without evaporation of water therefrom.

7. A process for the manufacture of porous or microporous articles of rubber or the like from aqueous dispersions thereof, which comprises admixing in said dispersion an aromatic di-substituted guanidine, molding said dispersion to the desired shape and mass, and heating the molded dispersion without evaporation of water therefrom to coagulate and gel the dispersion and simultaneously to vulcanize the gelled dispersion.

8. The process of claim 1, in which the di-substituted guanidine is a member of the class consisting of symmetrical diphenylguanidine, symmetrical phenyl-o-tolylguanidine and di-o-tolylguanidine.

9. A process for the manufacture of porous or microporous articles of vulcanized rubber or the like from aqueous dispersions of rubber material, which comprises admixing in the aforesaid dispersions an aromatic di-substituted guanidine, heating the thus treated dispersions to solidify the same while retaining the dispersing medium dispersed in minute particles throughout the mass and vulcanizing the products so obtained under such conditions that evaporation of liquid from the mass is prevented.

10. A process for the manufacture of porous or micro-porous articles of vulcanized rubber or the like from aqueous dispersions of rubber material, which comprises admixing in the aforesaid dispersions an aromatic di-substituted guanidine and raising the temperature of said dispersion to cause the dispersed particles to form a cellular structure and to vulcanize said structure while preventing the escape of the water contained within said cellular structure thereby preserving said cellular structure.

EVELYN WILLIAM MADGE.